June 30, 1959 G. E. FRANCK 2,892,480

FLARING TOOL

Filed Dec. 17, 1956 2 Sheets-Sheet 1

Inventor:
George E. Franck
Schroeder, Hofgren,
By. Brady & Wegner
Attorneys.

June 30, 1959 G. E. FRANCK 2,892,480

FLARING TOOL

Filed Dec. 17, 1956 2 Sheets-Sheet 2

Inventor.
George E. Franck
By. Schroeder, Hofgren, Brady & Wegner
Attorneys.

2,892,480
Patented June 30, 1959

2,892,480

FLARING TOOL

George E. Franck, Riverside, Ill., assignor to The Imperial Brass Manufacturing Company, a corporation of Illinois Application December 17, 1956, Serial No. 628,721

7 Claims. (Cl. 153—79)

This invention relates to a tube working tool and in particular to a tool for flaring the end of a tube.

In order to properly flare the end of a tube, it is necessary that axial alignment exist between the tube and the flaring cone or spreader of the flaring tool. In the flaring tools presently found in the art, the means for obtaining this axial alignment are relatively difficult and costly of manufacture, including such means as accurately machining the elements of the flaring tool and tube clamping means so that accurate registry therebetween is obtained. Another serious disadvantage found in such tools is the difficulty of providing suitable clamping means for use with any one of the large plurality of different tube sizes presently used in the field. Either several clamp elements, separate from the flaring means, and which may be thus easily lost, are provided, or cumbersome clamp elements having means for use with a plurality of tubes are used. In the latter construction a further problem arises through the provision in such tools of complicated and costly means for retaining the clamp means in operative association with the flaring tool.

The principal object of this invention is to provide a new and improved flaring tool of simple and economical construction which obviates each of the above indicated problems.

Another object is to provide such a flaring tool wherein axial alignment of the flaring element with the tube is obtained through the floating relationship of the yoke, carrying the flaring element, to the base of the tool carrying the clamping means.

A further object is to provide such a flaring tool having a new and improved clamping means accommodating any one of a large plurality of tubes having different diameters.

Still another object is to provide such a clamping means wherein the over-all size thereof is relatively small and yet a large number of different diameter tubes may be handled.

Yet another object is to provide a flaring tool with such a clamping means wherein means are provided for retaining the clamping means within the tool while permitting ready positioning therein.

A yet further object is to provide a flaring tool having new and improved means for urging the clamping means into positive tube holding arrangement.

Other features and advantages of the invention will be apparent from the following description taken in connection with the accompanying drawings wherein.

Figure 1:
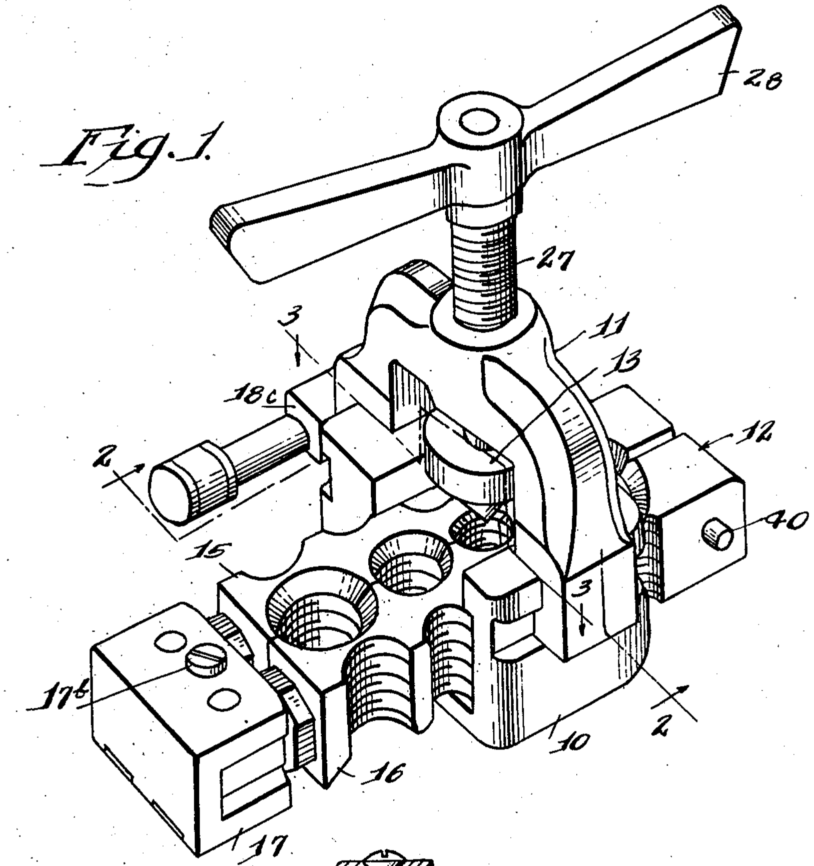
Fig. 1 is a perspective view of a tube flaring tool embodying the invention.

In the exemplary embodiment of the invention shown in the drawings, a flaring tool is shown to comprise a base 10 on which is floatingly carried a yoke 11 and clamping means generally designated 12. Operably associated with the yoke for advancement toward and withdrawal from the clamping means is a flaring element 13 arranged to engage forcibly the end of a tube 14 held in the clamping means. The loose connection between the yoke and the base allows the flaring element 13 to be centered automatically by engagement with the tube end thereby automatically assuring accurate alignment.

Clamping means 12 is of a new and improved construction comprising a pair of clamping blocks 15 and 16, respectively, each pivotally and rotatably connected to a clevis member 17. The clamping means are retained in the flaring tool by suitable coacting stop means to form an integral part thereof, and a portion of the stop means is arranged to act additionally as a gauge for automatically disposing a tube in the clamping means in the proper flaring position. To effect the clamping action of the clamping means 12 on the tube end and to retain the longitudinally movable clamp means fixedly during a flaring operation, a tightening member 18 is provided which has a tightening effect transversely of the longitudinal extent of the clamping blocks.

Figure 2:
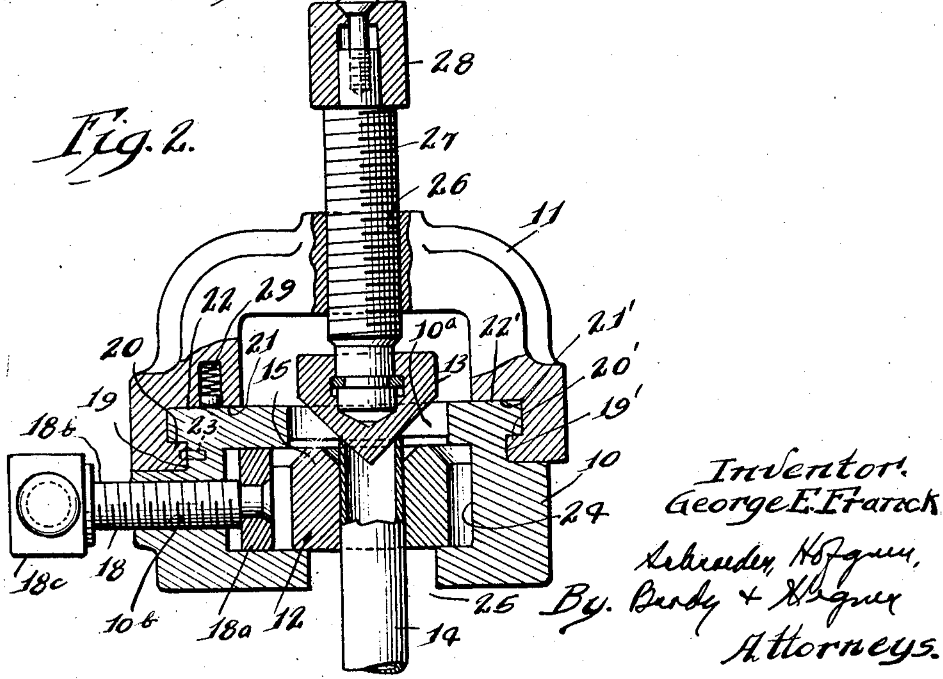
Fig. 2 is a vertical sectional view thereof taken transversely of the tube clamping means and through the axis of the flaring cone.

A general description of the structure comprehended by the invention having been presented, a more detailed analysis thereof will be made herefollowing. As best seen in Fig. 2, base 10 comprises an upwardly opening member of generally C-shaped construction having a pair of parallel grooves 19 and 19' in the outer walls of the opposed legs thereof forming slideways for the reception of complementary, inturned flanges 20 and 20' on the lower ends of the legs of yoke 11. Shoulders 21 and 21' are also provided on the yoke for sliding abutment with the upper surfaces 22 and 22' of the base legs. The fit of flanges 20 and 20' in ways 19 and 19' and the spacing of shoulders 21 and 21' from the flanges is made such that the mounting of the yoke on the base is extremely loose or floating, allowing a substantial degree of freedom of motion of the yoke relative to the base. To maintain the yoke on the base a pair of pins 23 and 23' are provided on the base to project outwardly at opposite ends of way 19.

Figures 3, 4, 5, 6:
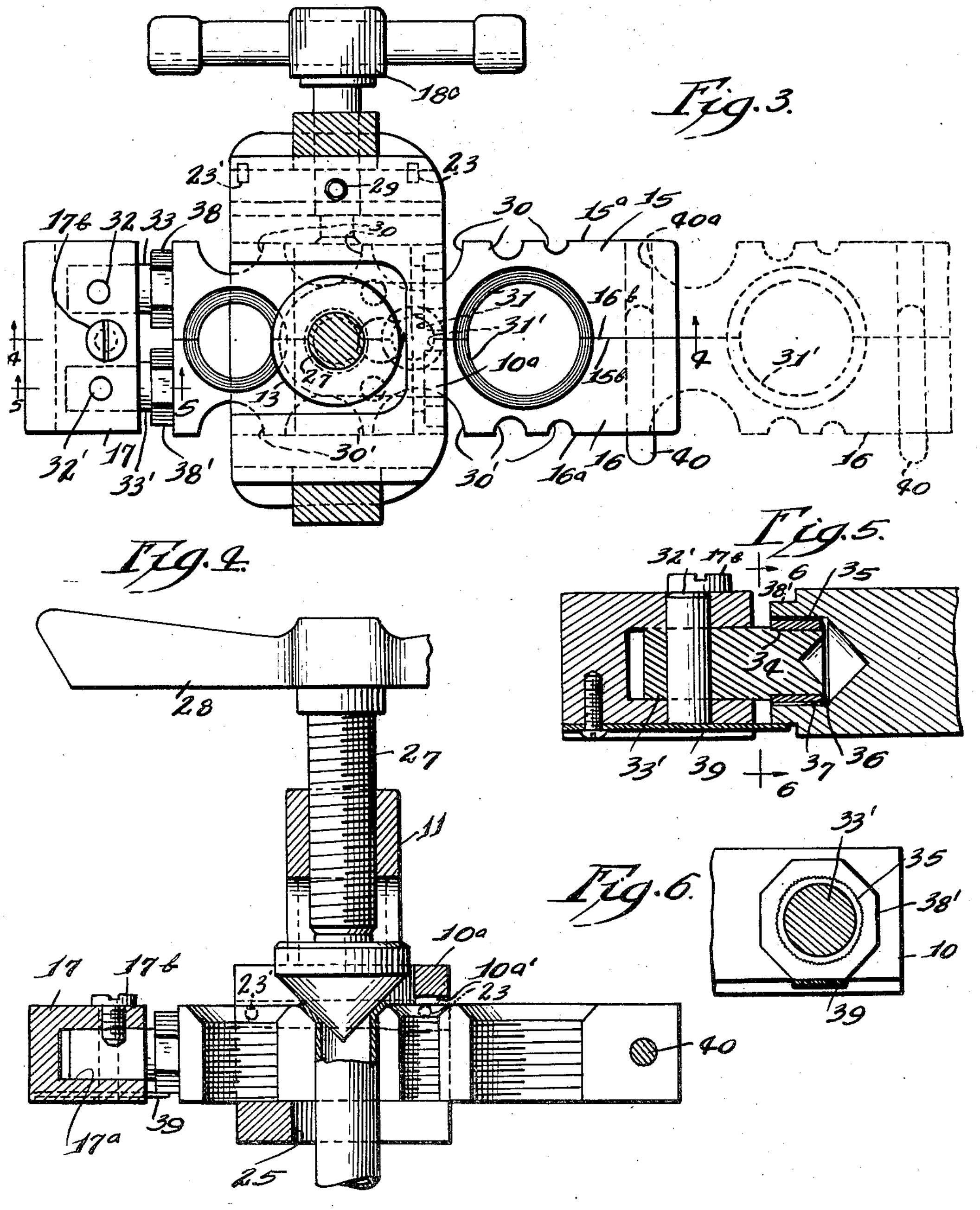
Fig. 3 is a horizontal sectional view thereof taken approximately along the line 3—3 of Fig. 1, with the clamping means shown in full lines in a different position from that of Fig. 1 and in dotted lines in another alternative position.
Fig. 4 is a vertical sectional view taken approximately along the line 4—4 of Fig. 3.
Fig. 5 is an enlarged fragmentary sectional view taken approximately along the line 5—5 of Fig. 3.
Fig. 6 is a sectional view taken approximately along the line 6—6 of Fig. 5.

The inner wall of base 10 is undercut to form a channel 24 extending parallel to the ways 19 and 19' and arranged to receive slidingly the clamping means 12. Extending transversely across the base above channel 24 at one end thereof (as best seen in Fig. 4) is a stop bar 10*a*. To permit the passage of the tube end, a slot 25 extends through the lower portion of the base, opening toward the end thereof below bar 10*a*. In properly flaring a tube end, it is necessary that the end of the tube originally extend a predetermined distance above the clamping means, as seen in Fig. 2. To gauge this tube positioning automatically, the bottom 10*a'* of stop bar 10*a* is disposed at the proper distance above channel 24.

The mid-portion of yoke 11 is provided with a threaded bore 26 extending longitudinally toward base 10, through which extends an exteriorly threaded rod 27 at the upper end of which is fixedly secured a manual operating handle 28 and at the lower end of which is secured the flaring cone or spreader 13. Means for releasably holding the yoke in any of a plurality of positions intermediate the ends of ways 19 and 19' may be provided and are herein disclosed a spring urged ball device 29, as best seen in Fig. 2. The retaining effect of device 29 is preferably small, the device serving merely as means for preventing unnecessary relative movement between the yoke and base.

The invention comprehends a means for holding the tube end 14 in operative association with flaring element 13, which is arranged to accommodate any one of a substantial plurality of different size tubes and yet which is small in size allowing its ready manipulation. To this end base 10, clamping means 12 and tightening means 18 are arranged and associated in a novel, integrated manner. Thus, the clamping means is made an integral part of the tool, while being arranged for facile positional adjustment of the components thereof to provide the desired large number of tube clamping configurations.

In the illustrative embodiment of the tool, the clamping means is shown to comprise a pair of elongated blocks 15 and 16, each block being rotatable about its longitudinal axis to present different faces in juxtaposed relationship to the other block as desired. The tube receiving means may be arranged peripherally transversely of the blocks and, thus, a plurality of side surfaces of the blocks may be used, allowing a substantial reduction in the length of the blocks for a given number of tube receiving means.

To select a desired tube receiving means for holding a given tube end, the blocks are disposed in proper facial juxtaposition and moved as a unit to the longitudinal position wherein the desired tube receiving means is aligned axially with flaring element 13. Tightening means 18 is arranged to act transversely of the blocks to bear against a portion of one block (shown as block 15) opposed to the face thereof juxtaposed to the other block (block 16), with the other block bearing against an opposed portion of the base. Thus, with a single tightening action the blocks may be clamped together to hold the tube end and concurrently the clamping means, as a whole, is fixedly positioned in the base during the flaring operation.

Means 17 for connecting blocks 15 and 16 is arranged in association with the base 10 to permit longitudinal movement of the blocks to a point where they are completely out of one end of channel 24, thereby allowing ready separation of the blocks for improved facility in rotation thereof about their longitudinal axes to effect a change in the tube holding configurations when desired. Further, such separation provides for improved facility in removing a flared tube end from between the blocks. Still another feature associated with means 17 is that one portion of the stop means for retaining the clamping means in the base may be mounted adjustably thereon, permitting in normal use the removal of the blocks completely from channel 24 while maintaining the retained association thereof with the base, yet further permitting when desired a complete removal and disassociation of the clamping means 12 from the base.

Referring particularly to Figs. 3–6, blocks 15 and 16 are seen to be mirror images of each other, comprising elongated clamping bars. Blocks 15 and 16 are provided with a first plurality of semi-cylindrical grooves 30 and 30', in one face 15*a* and 16*a*, respectively, and a second plurality of grooves 31 and 31' in the opposed faces 15*b* and 16*b*, respectively. Each of the grooves in block 15 is of a different diameter, the grooves in block 16 being complementary thereto, so that when the complementary semi-cylindrical grooves are juxtaposed suitable cylindrical grooves for receiving the cylindrical tube 14 are formed. It is preferred that the specific dimensioning of the grooves be such that each pair of complementary grooves have a diameter slightly smaller than the diameter of a tube they are adapted to receive. Thus, when the blocks are clamped tightly together the tube will be retained positively by the clamping action of the walls of the blocks defining the grooves acting against the tube. In the illustrative embodiment of the drawings nine such grooves are provided in each of the blocks, so that nine different diameter tubes may be accommodated by the relatively small clamping means 12. The specific number of such grooves may, of course, be made as desired.

As discussed above, means are provided for retaining the clamping means in the flaring tool while allowing ready rotation of the blocks 15 and 16 to dispose alternatively either of faces 15*a* and 16*a* or 15*b* and 16*b* in juxtaposition. The illustrated connecting or retaining means comprises a clevis 17 for pivotally and rotatively connecting the blocks at one end thereof. For this purpose, clevis 17 is provided with a recess 17*a* across which extends fixedly a pair of spaced pins 32 and 32'. Extending into recess 17 and having a pivotal connection to the pins is a pair of rods 33 and 33', which are reduced in diameter at their outer ends to form a radial shoulder 34. A journal bushing 35 carried over the outer end of the rod is held longitudinally in place against shoulder 34 by means such as peening the outer tip 36 of the rod. The bushings are fixedly received in recesses 37 provided in the ends of blocks 15 and 16 and, to provided improved gripping engagement of the bushings with the blocks in the recesses, the exterior periphery of the bushings may be serrated as seen in Fig. 6 The internal diameter of the bushings is made somewhat larger than the external diameter of the outer end of the rods so that the bushings and the clamping blocks mounted thereon are free to rotate about the axis of the rods, while the longitudinal fixation of the bushings 35 on the rods prevents the separation of the clamping blocks from the clevis. At the end adjacent the clevis each of blocks 15 and 16 may be provided with a polyhedral portion 38 and 38', respectively, for cooperation with a flat spring retaining member 39 serving to hold loosely the blocks in proper angular relationship while allowing their ready relative rotation when desired.

Upstanding from clevis 17 is a stop pin 17*b* which is arranged to have abutting relationship with stop bar 10*a* on the base. Stop pin 17*b* is threadedly received in the clevis so that it may be longitudinally adjusted, allowing it to be removed from the clevis permitting the clevis to pass under stop bar 10*a* should it be desired to remove the clamping means from the flaring tool. In normal use, however, the removal of the clamping blocks is not necessary as, when clamping means 12 is moved to the right as seen in Figs. 1 and 3 to a point where the stop pin 17*b* abuts the stop bar 10*a*, blocks 15 and 16 will be completely out of channel 24 allowing the blocks to be pivotally separated and rotated as desired. The limit of movement in the opposite direction (to the left as seen in Figs. 1 and 3) is effected by a stop pin 40 carried by clamping block 16 and arranged to abut base 10 at this limit of travel. Stop pin 40, as best seen in Fig. 3, extends completely through block 16 to project from each of surfaces 16*a* and 16*b*. Block 15 is provided with a bore 40*a*, opening at its opposite ends into surfaces 15*a* and 15*b*, which bore is complementary to stop pin 40. When the two blocks are juxtaposed, as seen in Fig. 3, pin 40 coacts with bore 40*a* to retain the blocks aligned and against undesired pivoting about their longitudinal axes.

As discussed above, to urge the clamping blocks forcibly together and retain a tube in a suitable pair of complementary grooves, tightening member 18 is arranged to have a bearing element 18*a* abut the outer face of block 15. A screw portion 18*b* extends through a threaded opening 10*b* in the base with its inner end pivotally connected to the bearing element, and a manually operable handle 18*c* is fixed to the outer end of the screw portion to effect rotation of the screw portion and alternatively the advancement or withdrawal of the bearing element relative to the clamping means.

The operation of the flaring tool is extremely simple. Firstly, clamping means 12 is adjusted to position the proper tube receiving groove directly below stop bar 10*a*. If it be necessary that the outer faces of the clamping blocks 15 and 16 be turned inwardly to form the desired groove, clamping means 12 is first moved to the right, as seen in Fig. 3, through channel 24 until pin 17*b* abuts stop bar 10*a*. The outer ends of the clamping blocks are then separated by pivoting the blocks about their respective pins 32 and 32'. Each of the blocks may then be readily rotated about connecting rods 33 and 33' to bring the originally outer surfaces into juxtaposition and the originally juxtaposed faces to the outer position. The clamping blocks are then brought together, such as seen in Fig. 3, and the clamping means is then moved to the left until the proper groove is disposed, as discussed above, directly below the stop bar. The end of tube 14 is then passed through opening 25 and into the selected cylindrical groove until it abuts bar bottom 10*a'*. This effects the proper longitudinal disposition of the tube in the clamping block for action therein by the flaring element 18*a'*. It is preferred that yoke 11, at this time, be disposed generally intermediate the ends of ways 19 and 19', this positioning being maintained by device 29.

The clamping means, carrying tube 14, is now moved leftwardly, as seen in Fig. 3, until the tube is aligned with the flaring elements. The clamping means is then tightened to hold securely the tube end, by operating member 18 to force element 18*a* tightly against block 15, which block is, in turn, forced tightly against block 16 whereby the tube end in the groove is securely retained and the clamping means 12 is fixedly held in base 10.

The flaring element is then readily brought into engagement with the end of the tube as seen in Fig. 2. Forceful advancement of the flaring element through manual operation of handle 28 may now be effected until the tube is completely flared as seen in Fig. 4. Should the positioning of yoke 11 originally be such that the flaring element is not truly axially aligned with tube 14, the force developed by this engagement during the flaring operation automatically moves the floating yoke relative to base 10 so that the flaring element will be properly aligned, thus assuring a proper and concentric flare.

To release the tube from the clamping means subsequent to the completion of the flaring operation, the tightening member 18 is merely reversely threaded until the bearing element 18*a* is sufficiently removed from block 15 to allow the separation of the blocks within channel 24, by the relative pivoting of the blocks about pins 32 and 32', allowing the flared end to pass through the now opened block grooves and the opening 25. In certain of the larger sizes of tubes, it may be found desirable to move the clamping means at least partially out of channel 24 to permit a greater separation thereof through pivoting them about pins 32 and 32' and thus provide increased clearance for the flared end in removing it. The tool is now immediately available for a subsequent flaring operation on the same diameter tubing or different diameter tubing as desired by a similar subsequent operation as described above.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A tool for flaring the end of a tube, comprising: a base; a flaring means carrying member relatively movably connected with said base; tube flaring means including a flaring cone and means carried by and connected with said carrying member operable to move said cone back and forth axially; tube clamping means movable in said base for positioning and retaining a tube end axially in the path of movement of said cone, said tube clamping means including a pair of elongated blocks each having a plurality of grooves arranged to define tube receiving recesses when said grooves are juxtaposed; and a clamp carried by the base to clamp the blocks together in the immediate vicinity of a selected pair of juxtaposed grooves aligned with said flaring cone and to secure the blocks against movement through the base, the movable connection of said carrying member with said base permitting free movement thereof in a plane perpendicular to the axis of said cone for effecting self centering of the cone relative to a tube fixed in said clamping means and said base as it makes contact with the tube.

2. The tool of claim 1 wherein the tube clamping means comprises a pair of complementary, elongated blocks arranged in side by side relationship, each of said blocks having a first plurality of grooves in one side face and a second plurality of grooves in another side face, each of the grooves in one block being of a different size and complementary to the grooves of the other block to define tube receiving recesses when said blocks are in side by side relationship, the blocks being free at one end and secured together at the other end for pivotal separation one from the other, and for rotational movement of each block about its longitudinal axis.

3. In a tool for flaring the end of a tube having a channeled base and flaring means operatively associated with the base, clamping means slidably associated with the channel in the base for fixedly retaining any one of a plurality of different size tube ends in operative relationship with the flaring means comprising: a pair of complementary, elongated blocks arranged in side by side relationship, each of said blocks having a first plurality of grooves in one side face and a second plurality of grooves in another side face, each of the grooves in one block being of a different size and complementary to the grooves of the other block to define tube receiving recesses when said blocks are in side by side relationship, means for securing said blocks to one another at one end, the remaining end being free, comprising a member common to said blocks and means associated with one end of each block attaching the same to said common member for pivotal movement relative to said common member and the other block in a plane perpendicular to the axes of the grooves in said blocks and for rotational movement about its axis when pivoted away from a parallel relationship with the other block, and means for forcibly urging said blocks together to clamp a tube inserted in one of the recesses.

4. The tool of claim 3 wherein the means associated with one end of each block attaching the same to said common member comprises a pair of shafts each connected to said common member for pivotal movement in a common plane and means attaching one of said blocks for rotational movement about its longitudinal axis to each of said shafts.

5. The tool of claim 4 wherein the means rotatably connecting a block to a shaft comprises a bushing rotatable on the shaft adjacent the outer end thereof, said bushing being fixedly secured in a recess in the end of the block, and the outer end of the shaft being radially enlarged to preclude loss of the bushing off of the end thereof.

6. The tool of claim 5 wherein the outer end of the shaft is peened and the bushings are exteriorly serrated.

7. The tool of claim 3 wherein the member common to said blocks is disposed to one side of the base when a tube is secured in said clamping means in position to be flared, there is a stop means on said clamping means, cooperating means on said base in position to be engaged by said stop means to prevent said common member from passing to the other side of said base and the means pivotally and rotatably associating each block with said common member being of such length as to permit movement of said block outwardly of the channel in said base to free the blocks for pivotal and rotational movement when said stop means engages said cooperating means.

References Cited in the file of this patent

UNITED STATES PATENTS

| | | |
|---|---|---|
| 1,451,727 | Harburg | Apr. 17, 1923 |
| 1,542,932 | Fullington | June 23, 1925 |
| 2,089,133 | Parker | Aug. 3, 1937 |
| 2,455,024 | Schneider | Nov. 30, 1948 |
| 2,483,982 | Paquin | Oct. 4, 1949 |
| 2,505,665 | Franck | Apr. 25, 1950 |
| 2,534,510 | Franck | Dec. 19, 1950 |